United States Patent
Koh et al.

(10) Patent No.: US 10,446,874 B2
(45) Date of Patent: Oct. 15, 2019

(54) LITHIUM SULFUR BATTERY AND METHOD FOR PRODUCING SAME

(71) Applicant: LG CHEM, LTD., Seoul (KR)

(72) Inventors: Dong Wook Koh, Daejeon (KR); Eun Kyung Park, Daejeon (KR); Jong Hyun Chae, Daejeon (KR); Doo Kyung Yang, Daejeon (KR); Ki Young Kwon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/522,915

(22) PCT Filed: Oct. 30, 2015

(86) PCT No.: PCT/KR2015/011558
§ 371 (c)(1),
(2) Date: Apr. 28, 2017

(87) PCT Pub. No.: WO2016/068641
PCT Pub. Date: May 6, 2016

(65) Prior Publication Data
US 2017/0263978 A1 Sep. 14, 2017

(30) Foreign Application Priority Data

Oct. 31, 2014 (KR) .................. 10-2014-0150445
Oct. 30, 2015 (KR) .................. 10-2015-0151556

(51) Int. Cl.
*H01M 10/0525* (2010.01)
*H01M 4/134* (2010.01)
(Continued)

(52) U.S. Cl.
CPC ....... *H01M 10/0565* (2013.01); *H01M 4/134* (2013.01); *H01M 4/136* (2013.01);
(Continued)

(58) Field of Classification Search
CPC ........ H01M 10/0565; H01M 10/0525; H01M 4/136; H01M 4/134; H01M 4/364;
(Continued)

(56) References Cited

U.S. PATENT DOCUMENTS

| | | |
|---|---|---|
| 5,837,157 A | 11/1998 | Kohjiya et al. |
| 6,733,924 B1 | 5/2004 | Skotheim et al. |

(Continued)

FOREIGN PATENT DOCUMENTS

| | | |
|---|---|---|
| CN | 101601150 A | 12/2009 |
| CN | 103620850 A | 3/2014 |

(Continued)

OTHER PUBLICATIONS

International Search Report, issued in PCT/KR2015/011558, dated Feb. 12, 2016.

(Continued)

*Primary Examiner* — Brittany L Raymond
(74) *Attorney, Agent, or Firm* — Birch, Stewart, Kolasch & Birch, LLP

(57) ABSTRACT

The present disclosure relates to a lithium sulfur battery comprising a negative electrode and a positive electrode disposed opposite to each other, a separator positioned between the negative electrode and the positive electrode, and a gel polymer electrolyte positioned between the separator and the positive electrode, wherein the gel polymer electrolyte comprises $LiNO_3$.

The present disclosure relates to a lithium sulfur battery preventing degeneration caused by a shuttle effect, and the lithium sulfur battery comprises a gel polymer electrolyte configured to inhibit a transfer of a polysulfide-based material to a negative electrode so as to prevent a loss of the polysulfide formed on a positive electrode surface during (Continued)

charge and discharge reactions, whereby, lifespan characteristics of the lithium sulfur battery are capable of being enhanced.

6 Claims, 4 Drawing Sheets

(51) Int. Cl.
H01M 4/36 (2006.01)
H01M 4/587 (2010.01)
H01M 4/62 (2006.01)
H01M 4/66 (2006.01)
H01M 4/136 (2010.01)
H01M 4/38 (2006.01)
H01M 10/0565 (2010.01)
H01M 10/052 (2010.01)
H01M 10/058 (2010.01)
H01M 4/04 (2006.01)
H01M 4/1397 (2010.01)

(52) U.S. Cl.
CPC ............ *H01M 4/364* (2013.01); *H01M 4/38* (2013.01); *H01M 4/382* (2013.01); *H01M 4/587* (2013.01); *H01M 4/622* (2013.01); *H01M 4/625* (2013.01); *H01M 4/661* (2013.01); *H01M 10/052* (2013.01); *H01M 10/058* (2013.01); *H01M 10/0525* (2013.01); H01M 4/0404 (2013.01); H01M 4/1397 (2013.01); H01M 2220/20 (2013.01)

(58) Field of Classification Search
CPC ...... H01M 4/382; H01M 4/587; H01M 4/625; H01M 4/661; H01M 4/1397; H01M 4/0404; H01M 4/622; H01M 2220/20
See application file for complete search history.

(56) References Cited

U.S. PATENT DOCUMENTS

| 6,797,428 | B1 | 9/2004 | Skotheim et al. |
| 2002/0028388 | A1 | 3/2002 | Lee |
| 2002/0102464 | A1 | 8/2002 | Yoshida et al. |
| 2005/0147891 | A1 | 7/2005 | Mikhaylik |
| 2005/0175903 | A1 | 8/2005 | Kim et al. |
| 2007/0082264 | A1 | 4/2007 | Mikhaylik |
| 2010/0129699 | A1 | 5/2010 | Mikhaylik et al. |
| 2011/0195314 | A1 | 8/2011 | Yu et al. |
| 2011/0256456 | A1* | 10/2011 | Jeon ............... H01M 10/0565 429/303 |
| 2011/0287305 | A1* | 11/2011 | Scordilis-Kelley ............ H01M 2/1653 429/163 |
| 2012/0052397 | A1 | 3/2012 | Mikhaylik et al. |
| 2012/0094187 | A1 | 4/2012 | Kwon et al. |
| 2012/0115040 | A1 | 5/2012 | Kwon et al. |
| 2014/0093784 | A1 | 4/2014 | Kwon et al. |
| 2014/0127419 | A1 | 5/2014 | Fleischmann et al. |
| 2014/0342209 | A1* | 11/2014 | He ............... H01M 10/056 429/101 |
| 2015/0249244 | A1 | 9/2015 | Thieme et al. |
| 2016/0028110 | A1 | 1/2016 | Yu et al. |

FOREIGN PATENT DOCUMENTS

| DE | 102012018621 A1 | 4/2014 |
| JP | 2002-175837 A | 6/2002 |
| JP | 5112584 B2 | 1/2013 |
| KR | 10-1999-0053022 A | 7/1999 |
| KR | 10-2002-0019213 A | 3/2002 |
| KR | 10-0402997 B1 | 4/2004 |
| KR | 10-2005-0022567 A | 3/2005 |
| KR | 10-2005-0022616 A | 3/2005 |
| KR | 10-2006-0125852 A | 12/2006 |
| KR | 10-2006-0125853 A | 12/2006 |
| KR | 10-2010-0016919 A | 2/2010 |
| KR | 10-2011-0136740 A | 12/2011 |
| KR | 10-1167334 B1 | 7/2012 |
| KR | 10-2013-0001126 A | 1/2013 |
| KR | 10-2013-0105839 A | 9/2013 |
| KR | 10-1422311 B1 | 7/2014 |
| KR | 10-2015-0050412 A | 5/2015 |
| KR | 10-2015-0056122 A | 5/2015 |
| WO | WO 2013-191790 | * 12/2013 |
| WO | WO 2013/191790 A1 | 12/2013 |

OTHER PUBLICATIONS

Extended European Search Report for European Application No. 15856009.4, dated Feb. 16, 2018.

* cited by examiner

LITHIUM SULFUR BATTERY AND METHOD FOR PRODUCING SAME

TECHNICAL FIELD

The present disclosure relates to a lithium sulfur battery preventing degeneration caused by a shuttle effect, and a method for manufacturing the same. The present disclosure relates to a lithium sulfur battery comprising a gel polymer electrolyte configured to inhibit a transfer of a polysulfide-based material to a negative electrode so as to prevent a loss of the polysulfide formed on a positive electrode surface during charge and discharge reactions, and therefore, having enhanced lifespan characteristics, and a method for manufacturing the same.

BACKGROUND ART

Despite their generally low discharging potential of approximately 2 V, lithium sulfur batteries have received attention as a battery for next generation electric vehicles due to their excellent safety, low active material costs, and discharging capacity of 2,600 Wh/kg.

Lithium-sulfur batteries are a secondary battery normally using sulfur series compounds having sulfur-sulfur bonds as a positive electrode active material, and using alkali metals such as lithium, or carbon-based materials capable of intercalation and deintercalation of metal ions such as lithium ions as a negative electrode active material, and store and generate electric energy using an oxidation-reduction reaction reducing an oxidation number of sulfur (S) as sulfur-sulfur (S—S) bonds are broken during a reduction reaction (discharge) and forming sulfur-sulfur (S—S) bonds again as an oxidation number of sulfur (S) increases during an oxidation reaction (charge).

However, such lithium sulfur batteries have a problem in that lifespan characteristics are reduced due to a phenomenon of losing lithium polysulfide formed in a positive electrode during charge and discharge reactions outside the positive electrode reaction area. A Li—S battery forms a polysulfide intermediate when charged and discharged. The polysulfide is eluted in an electrolyte diffusing to a negative electrode surface, and reacts with the negative electrode to form insoluble $Li_2S$ and $Li_2S_2$. Sulfur used as a positive electrode active material is lost due to such a reaction and battery performance declines, and such a phenomenon is referred to as a shuttle effect.

Specifically, in a lithium sulfur battery, sulfur-sulfur chemical bonds during discharge are gradually cut and transferred to sulfur-lithium bonds, and lithium polysulfide ($Li_2S_x$, x=8,6,4,2) formed in the middle readily bonds with a hydrophilic solvent as a material having strong polarity. The lithium polysulfide dissolved in an electrolyte may diffuse in the form of $LiS_x$ or anions ($LiS_x^-$, $S_x^{2-}$), and when the lithium polysulfide diffuses from a sulfur positive electrode, the lithium polysulfide escapes from an electrochemical reaction area of the positive electrode decreasing an amount of sulfur participating in the electrochemical reaction in the positive electrode, which resultantly causes a capacity loss. There are also problems in that lithium polysulfide reacts with a lithium metal negative electrode through continuous charge and discharge reactions, and lithium sulfide ($Li_2S$) is fixed on the lithium metal surface, and as a result, reaction activity decreases and potential characteristics become inferior.

Technologies having been used in the art to solve such a problem of lithium polysulfide loss in lithium sulfur batteries are largely divided into 3 technologies. The first method is delaying a positive electrode active material outflow by adding an additive having a property of adsorbing sulfur to a positive electrode mixture, and herein, examples of the used additive may comprise active carbon fiber, transition metal chalcogenides, alumina, silica and the like. The second method is surface treating a sulfur surface with a material comprising hydroxides, oxyhydroxides of coating elements, oxycarbonates of coating elements or hydroxy-carbonates of coating elements. The third method is preparing a carbon material as a nanostructure to restrain lithium polysulfide in a nano-structured capillary tube.

However, in the above-mentioned technologies, the method of adding an additive adsorbing sulfur to a positive electrode has a problem of electroconductive deterioration and has a risk of battery side reaction caused by the additive, and the method is not preferred in terms of costs as well.

The technology of surface treating a sulfur surface with a certain material has a problem of losing sulfur during the treatment process, and also has a disadvantage of requiring high costs.

Lastly, the method of preparing a conductor as a nanostructure has problems in that the manufacturing process is complicated and high costs are required, a battery volume capacity loss occurs due to the volume occupied by the carbon nanostructure, and in addition thereto, the nanostructure may lose its function during a rolling process of a battery manufacturing process.

DISCLOSURE

Technical Problem

The present disclosure is directed to providing a lithium sulfur battery capable of effectively blocking a shuttle reaction of polysulfide, and a method for manufacturing the same.

Technical Solution

One embodiment of the present disclosure provides a lithium sulfur battery comprising a positive electrode and a negative electrode disposed opposite to each other, a separator positioned between the positive electrode and the negative electrode, and a gel polymer electrolyte positioned between the separator and the positive electrode, wherein the gel polymer electrolyte comprises $LiNO_3$.

The gel polymer electrolyte may be coated on either a surface of the positive electrode or a surface of the separator.

The gel polymer electrolyte may comprise a polymer matrix, and an organic solvent and a lithium salt supported on the polymer matrix.

The polymer matrix may be a polymer polymerizing a trimethylolpropane ethoxylate triacrylate monomer.

Another embodiment of the present disclosure provides a method for manufacturing a lithium sulfur battery comprising mixing a monomer, an organic solvent, a lithium salt and $LiNO_3$, coating the mixture on a positive electrode or a separator and then curing the result to prepare a gel polymer electrolyte positioned between the separator and the positive electrode.

The monomer may be trimethylolpropane ethoxylate triacrylate.

The solvent may be any one selected from the group consisting of triethylene glycol dimethyl ether (TEGDME), dioxolane (DOL), dimethoxyethane (DME) and mixed solutions thereof.

The lithium salt may be lithium bis-trifluoromethanesulfonimide (LiTFSI).

Advantageous Effects

The present disclosure relates to a lithium sulfur battery preventing degeneration caused by a shuttle effect, and a method for manufacturing the same, and by comprising a gel polymer electrolyte configured to inhibit a transfer of a polysulfide-based material to a negative electrode, the lithium sulfur battery prevents a loss of the polysulfide formed on a positive electrode surface during charge and discharge reactions, whereby lifespan characteristics of the lithium sulfur battery can be enhanced.

DESCRIPTION OF DRAWINGS

FIGS. 2 to 4 are results at 1st cycle, 2nd cycle and $12^{th}$ cycle, respectively.

MODE FOR DISCLOSURE

Hereinafter, embodiments of the present disclosure will be described in detail so that those skilled in the art may readily implement the present disclosure. However, the present disclosure may be implemented in various different forms, and is not limited to the embodiments described herein.

Figure 1:
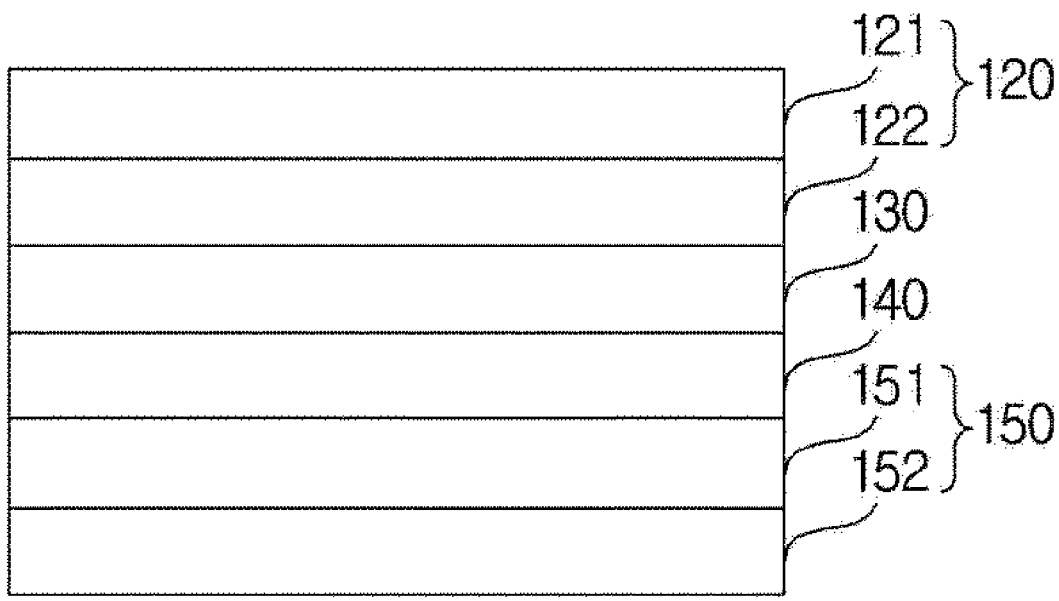
FIG. 1 is a schematic sectional view illustrating a lithium sulfur battery of the present disclosure forming a gel polymer layer between a positive electrode and a separator.

FIG. 1 is a schematic sectional view illustrating a lithium sulfur battery of the present disclosure forming a gel polymer layer between a positive electrode and a separator.

Hereinafter, when referring to FIG. 1, the lithium sulfur battery according to one embodiment of the present disclosure comprises a positive electrode (120) and a negative electrode (150) disposed opposite to each other, a separator (140) positioned between the positive electrode (120) and the negative electrode (150), and a gel polymer electrolyte (130) positioned between the separator (140) and the positive electrode (120).

The positive electrode (120) may comprise, as one example, a positive electrode current collector (121) and a positive electrode active material layer (122) positioned on the positive electrode current collector (121) and comprising a positive electrode active material and, selectively, a conductor and a binder.

As the positive electrode current collector (121), using foamed aluminum, foamed nickel and the like having excellent conductivity may be preferred.

In addition, the positive electrode active material layer (122) may comprise elemental sulfur (S8), sulfur series compounds or mixtures thereof as the positive electrode active material. The sulfur series compound may specifically be $Li_2S_n$ (n≥1), an organosulfur compound, a carbon-sulfur polymer $((C_2S_x)_n: x=2.5$ to $50, n≥2)$ or the like.

The positive electrode active material layer (122) may further comprise, together with the positive electrode active material, a conductor for letting electrons to smoothly migrate in the positive electrode (120), and a binder for increasing binding strength between the positive electrode active materials or between the positive electrode active material and the positive electrode current collector (110).

The conductor may be a carbon-based material such as carbon black, acetylene black and ketjen black; or a conductive polymer such as polyaniline, polythiophene, polyacetylene and polypyrrole, and may be preferably comprised in 5% by weight to 20% by weight with respect to the total weight of the positive electrode active material layer. When the conductor content is less than 5% by weight, effects of enhancing conductivity obtained from the use of the conductor are insignificant, and when the content is greater than 20% by weight, the positive electrode active material content relatively decreases causing a concern of decline in the capacity characteristics.

As the binder, poly(vinyl acetate), polyvinyl alcohol, polyethylene oxide, polyvinyl pyrrolidone, alkylated polyethylene oxide, crosslinked polyethylene oxide, polyvinyl ether, poly(methyl methacrylate), polyvinylidene fluoride, a copolymer of polyhexafluoropropylene and polyvinylidene fluoride (product name: Kynar), poly(ethyl acrylate), polytetrafluoroethylene, polyvinyl chloride, polyacrylonitrile, polyvinylpyridine, polystyrene, and derivatives, blends and copolymers thereof, and the like, may be used. The binder may be preferably comprised in 5% by weight to 20% by weight with respect to the total weight of the positive electrode active material layer. When the binder content is less than 5% by weight, effects of improving binding strength between the positive electrode active materials or between the positive electrode active material and the current collector obtained from the use of the binder are insignificant, and when the content is greater than 20% by weight, the positive electrode active material content relatively decreases causing a concern of decline in the capacity characteristics.

Such a positive electrode (120) may be prepared using common methods, and specifically, may be prepared by coating a composition for forming a positive electrode active material layer prepared by mixing the positive electrode active material, the conductor and the binder in an organic solvent on the positive electrode current collector, then drying and selectively rolling the result.

Herein, as the organic solvent, solvents capable of uniformly dispersing the positive electrode active material, the binder and the conductor, and readily evaporating, are preferably used. Specific examples thereof may comprise acetonitrile, methanol, ethanol, tetrahydrofuran, water, isopropyl alcohol and the like.

Meanwhile, in the lithium sulfur battery, the negative electrode (150) may comprise, as a negative electrode active material, a material selected from the group consisting of materials capable of reversibly intercalating or deintercalating lithium ions, materials capable of reversibly forming lithium-containing compounds by reacting with lithium ions, lithium metal and lithium alloys.

As the material capable of reversibly intercalating or deintercalating lithium ions, any carbon-based negative electrode active material generally used in lithium sulfur batteries as a carbon material may be used, and specific examples thereof may comprise crystalline carbon, amorphous carbon or materials using these together. In addition, typical examples of the material capable of reversibly forming lithium-containing compounds by reacting with lithium ions may comprise tin oxide ($SnO_2$), titanium nitrate, silicon (Si) and the like, but are not limited thereto. The alloy of lithium metal may specifically be an alloy of lithium and metals of Si, Al, Sn, Pb, Zn, Bi, In, Mg, Ga, or Cd.

The negative electrode (150) may selectively further comprise a binder together with the negative electrode active material.

The binder performs a role of pasting the negative electrode active material, adhering the active materials to each other, adhering the active material and the current collector, and having a buffering effect for expansion and contraction of the active material, and the like. Specifically, the binder is the same as described above.

In addition, the negative electrode (150) may further comprise a negative electrode current collector (152) for supporting a negative electrode active material layer (151) comprising the negative electrode active material and the binder.

The negative electrode current collector (152) may specifically be selected from the group consisting of copper, aluminum, stainless steel, titanium, silver, palladium, nickel, alloys thereof and combinations thereof. The stainless steel may be surface treated with carbon, nickel, titanium or silver, and aluminum-cadmium alloys may be used as the alloy. In addition thereto, baked carbon, non-conductive polymers of which surface is treated with a conductor, conductive polymers or the like may also be used.

In addition, the negative electrode (150) may be lithium metal foil.

In addition, in the lithium sulfur battery, the separator (140) is a physical separator having a function of physically separating electrodes, and those commonly used as a separator in lithium sulfur batteries may be used without particular limit, and particularly, those having an excellent electrolyte moisture retention ability while having low resistance for ion migration of the electrolyte are preferred. Specifically, porous polymer films, for example, porous polymer films prepared with a polyolefin-based polymer such as an ethylene homopolymer, a propylene homopolymer, an ethylene/butene copolymer, an ethylene/hexene copolymer and an ethylene/methacrylate copolymer may be used either alone or as laminates thereof, or common porous non-woven fabrics, for example, non-woven fabrics made of high melting point glass fiber or polyethylene terephthalate fiber may be used, however, the separator is not limited thereto.

The lithium sulfur battery may further comprise an electrolyte immersed into the separator (140). The electrolyte may comprise an organic solvent and a lithium salt.

Specifically, the organic solvent may be a polar solvent such as an aryl compound, bicyclic ether, non-cyclic carbonate, a sulfoxide compound, a lactone compound, a ketone compound, an ester compound, a sulfate compound and a sulfite compound.

More specifically, examples of the organic solvent may comprise 1,2-dimethoxyethane, 1,2-diethoxyethane, 1,2-dibutoxyethane, dioxolane (DOL), 1,4-dioxane, tetrahydrofuran, 2-methyltetrahydrofuran, dimethyl carbonate (DMC), diethyl carbonate (DEC), ethylmethyl carbonate (EMC), methylpropyl carbonate (MPC), ethylpropyl carbonate, dipropyl carbonate, butylethyl carbonate, ethyl propanoate (EP), toluene, xylene, dimethyl ether (DME), diethyl ether, triethylene glycol monomethyl ether (TEGME), diglyme, tetraglyme, hexamethylphosphorictriamide, gamma butyrolactone (GBL), acetonitrile, propionitrile, ethylene carbonate (EC), propylene carbonate (PC), N-methylpyrrolidone, 3-methyl-2-oxazolidone, acetic acid ester, butyric acid ester, propionic ester, dimethylformamide, sulfolane (SL), methyl sulfolane, dimethylacetamide, dimethyl sulfoxide, dimethyl sulfate, ethylene glycol diacetate, dimethyl sulfite, ethylene glycol sulfite or the like.

Among these, a mixed solvent of triethylene glycol monomethyl ether/dioxolane/dimethyl ether may be more preferred.

The lithium salt may be used without particular limit as long as it is a compound capable of providing lithium ions used in lithium secondary batteries. Specific examples of the lithium salt may comprise $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$ (lithium bis(perfluoroethylsulfonyl)imide, BETI), $LiN(CF_3SO_2)_2$ (lithium bis(trifluoromethanesulfonyl)imide, LiTFSI), $LiN(C_aF_{2a+1}SO_2)$ $C_bF_{2b+1}SO_2)$ (however, a and b are natural numbers, and preferably and lithium poly[4,4'-(hexafluoroisopropylidene)diphenoxy]sulfonylimide (LiPHFIPSI), LiCl, LiI, $LiB(C_2O_4)_2$ and the like, and among these, sulfonyl group-containing imide lithium compounds such as LiTFSI, BETI or LiPHFIPSI may be more preferred.

In addition, the lithium salt is preferably comprised in 10% by weight to 35% by weight with respect to the total weight of the electrolyte. When the lithium salt content is less than 10% by weight, conductivity of the electrolyte decreases leading to a decline in the electrolyte performance, and when the content is greater than 35% by weight, viscosity of the electrolyte increases leading to a problem of reducing mobility of the lithium ions.

Meanwhile, the lithium sulfur battery comprises a gel polymer electrolyte (130) positioned between the separator (140) and the positive electrode (120). The gel polymer electrolyte (130) is the electrolyte being supported on a polymer matrix.

The polymer matrix is not particularly limited, however, polymer resins comprising at least one or more types of polyethylene oxide-based polymer compounds, polyorganosiloxane chains, polyoxyalkylene chains or the like may be used, and preferably, may be prepared by polymerizing a trimethylolpropane ethoxylate triacrylate monomer. When using the polymer of a trimethylolpropane ethoxylate triacrylate monomer as the polymer matrix, ion conductivity may be enhanced since an ion dissociation ability of the polymer matrix and an impregnation ability of the electrolyte are favorable.

The trimethylolpropane ethoxylate triacrylate may have a weight average molecular weight of 200 g/mol to 1000 g/mol, and preferably 300 g/mol to 700 g/mol. When the trimethylolpropane ethoxylate triacrylate has a weight average molecular weight of less than 200 g/mol, ion conductivity may decrease, and when the weight average molecular weight is greater than 1000 g/mol, a physical shuttle inhibition effect may decline.

The electrolyte supported in the gel polymer electrolyte (130) may comprise an organic solvent and a lithium salt. Descriptions on the organic solvent and the lithium salt are the same as above, and will not be repeated.

The electrolyte additionally comprises $LiNO_3$. When the electrolyte comprises the $LiNO_3$, a shuttle inhibition effect may be enhanced. The electrolyte may comprise the $LiNO_3$ in 1% by weight to 50% by weight with respect to the total weight of the electrolyte, and preferably in 1.5% by weight to 10% by weight. When the $LiNO_3$ content is less than 1% by weight, a shuttle inhibition effect may not be obtained, and when the $LiNO_3$ content is greater than 50% by weight, side reactions may occur due to the decomposition of the $LiNO_3$. The gel polymer electrolyte (130) may be prepared by mixing the monomer forming the polymer matrix, the organic solvent, the lithium salt and the $LiNO_3$, and curing the mixture. The curing may be thermal curing or photocuring. For this, the mixture may further comprise a thermal curing agent or a photocuring agent.

The mixture may comprise the organic solvent and the lithium salt in a weight ratio of 10:1 to 1:1, and preferably in a weight ratio of 4:1 to 2:1. When the weight ratio of the organic solvent is less than 10:1 and greater than 1:1, ion conductivity may decrease in both cases.

The mixture may comprise the organic solvent comprising the lithium salt, and the monomer in a weight ratio of 99:1 to 10:90, and preferably in a weight ratio of 95:5 to 70:30. When the weight ratio of the monomer is less than 99:1, a shuttle inhibition effect may decline, and when the weight ratio is greater than 10:90, battery capacity may decrease due to a decrease in the ion conductivity.

The gel polymer electrolyte (130) may be prepared by preparing the mixture into an independent film and then interposing the film between the separator (140) and the positive electrode (120), or by coating the mixture on the separator (140) or the positive electrode (120) and curing the result.

The method of coating the mixture on the separator (140) or the positive electrode (120) is not particularly limited, and a screen printing method, a spray coating method, a coating method using a doctor blade, a gravure coating method, a dip coating method, a silk screen method, a painting method, a coating method using a slit die, a spin coating method, a roll coating method, a transfer coating method and the like may be used.

The curing may be thermal curing or photocuring, and in the thermal curing, the curing may be carried out at 60° C. to 200° C., and preferably at 60° C. to 150° C. When the curing temperature is lower than 60° C., the curing is not sufficient, which decreases a physical shuttle inhibition effect, and when the curing temperature is higher than 150° C., ion conductivity and capacity may decrease due to volatilization of the impregnated liquid electrolyte.

Hereinafter, the present disclosure will be described in detail with reference to examples so that those having common knowledge in the technology field to which the present disclosure belongs readily implement the present disclosure. However, the present disclosure may be implemented in various different forms, and the scope of the present disclosure is not limited to the examples described herein.

Example: Preparation of Gel Polymer Electrolyte Membrane and Manufacture of Battery Using the Same Comparative Example 1

A composite was prepared in advance with sulfur (average particle size: 40 μm) and Super P in ethanol using a ball mill. The prepared composite was mixed with a conductor and a binder using a mixer to prepare a composition for forming a positive electrode active material layer. Herein, carbon black was used as the conductor, and SBR was used as the binder, and they were mixed so that composite:conductor:binder was 75:20:5 in a weight ratio. The prepared composition for forming a positive electrode active material layer was coated on an aluminum current collector, and the result was dried to prepare a positive electrode (energy density of positive electrode: 1.0 mAh/cm$^2$).

In addition, lithium metal foil was prepared as a negative electrode.

A gel polymer electrolyte precursor material mixing a trimethylolpropane ethoxylate triacrylate monomer to an electrolyte, in which LiTFSI was mixed as a lithium salt in an organic solvent of TEGDME/DOL/DME (1/1/1 vol.) in a weight ratio of LiTFSI:organic solvent=1:3, in a weight ratio of organic solvent:monomer=90:10 was photocured to form a gel polymer electrolyte membrane.

The gel polymer electrolyte-formed positive electrode and the negative electrode were placed opposite to each other, and a polyethylene separator was interposed between the positive electrode and the negative electrode.

After that, an electrolyte was injected into a case to manufacture a lithium sulfur battery. Herein, as the electrolyte, an electrolyte in which LiTFSI was mixed as a lithium salt in an organic solvent of TEGDME/DOL/DME (1/1/1 vol.) in a weight ratio of LiTFSI:organic solvent=1:3 was used.

Example 1

A composite was prepared in advance with sulfur (average particle size: 40 μm) and Super P in ethanol using a ball mill. The prepared composite was mixed with a conductor and a binder using a mixer to prepare a composition for foisting a positive electrode active material layer. Herein, carbon black was used as the conductor, and SBR was used as the binder, and they were mixed so that composite:conductor:binder was 75:20:5 in a weight ratio. The prepared composition for forming a positive electrode active material layer was coated on an aluminum current collector, and the result was dried to prepare a positive electrode (energy density of positive electrode: 1.0 mAh/cm$^2$).

In addition, lithium metal foil was prepared as a negative electrode.

A gel polymer electrolyte precursor material mixing a trimethylolpropane ethoxylate triacrylate monomer to an electrolyte, in which LiTFSI was mixed as a lithium salt in an organic solvent of TEGDME/DOL/DME (1/1/1 vol.) in a weight ratio of LiTFSI:organic solvent=1:3 and LiNO$_3$ was added in a weight ratio of 1/10 of the LiTFSI, in a weight ratio of organic solvent:monomer=90:10 was coated on the positive electrode surface and photocured to foist a gel polymer electrolyte membrane.

The gel polymer electrolyte-formed positive electrode and the negative electrode were placed opposite to each other, and a polyethylene separator was interposed between the positive electrode and the negative electrode.

After that, an electrolyte was injected into a case to manufacture a lithium sulfur battery. Herein, as the electrolyte, an electrolyte in which LiTFSI was mixed as a lithium salt in an organic solvent of TEGDME/DOL/DME (1/1/1 vol.) in a weight ratio of LiTFSI:organic solvent=1:3 and LiNO$_3$ was added in a weight ratio of 1/10 of the LiTFSI was used.

Example 2

A gel polymer electrolyte membrane was formed in the same manner as in Example 1 except that, in the gel polymer electrolyte precursor material of Example 1, the weight ratio of organic solvent:monomer was changed to 85:15.

Example 3

A gel polymer electrolyte membrane was formed in the same manner as in Example 1 except that, in the gel polymer electrolyte precursor material of Example 1, the weight ratio of organic solvent:monomer was changed to 80:20.

Example 4

A gel polymer electrolyte membrane was formed in the same manner as in Example 1 except that, in the gel polymer electrolyte precursor material of Example 1, the weight ratio of LiTFSI:organic solvent was changed to 1:2.

Test Example

In the lithium sulfur batteries of Examples 1 to 4, ion conductivity of the prepared electrolyte was measured preparing a coin cell employing SUS as an electrode and using an electrochemical impedance spectroscopy (EIS) method, and the results are shown in the following Table 1.

TABLE 1

| | Organic Solvent:Monomer Weight Ratio | Lithium Salt:Organic Solvent Weight Ratio | Ion Conductivity |
|---|---|---|---|
| Example 1 | 90:10 | 1:3 | $1.1 \times 10^{-3}$ S/cm |
| Example 2 | 85:15 | 1:3 | $4.1 \times 10^{-4}$ S/cm |
| Example 3 | 80:20 | 1:3 | $6.6 \times 10^{-5}$ S/cm |
| Example 4 | 85:15 | 1:2 | $1.8 \times 10^{-4}$ S/cm |

When referring to Table 1, it was seen that ion conductivity of the electrolyte prepared in Example 1 was most superior.

Figure 2:
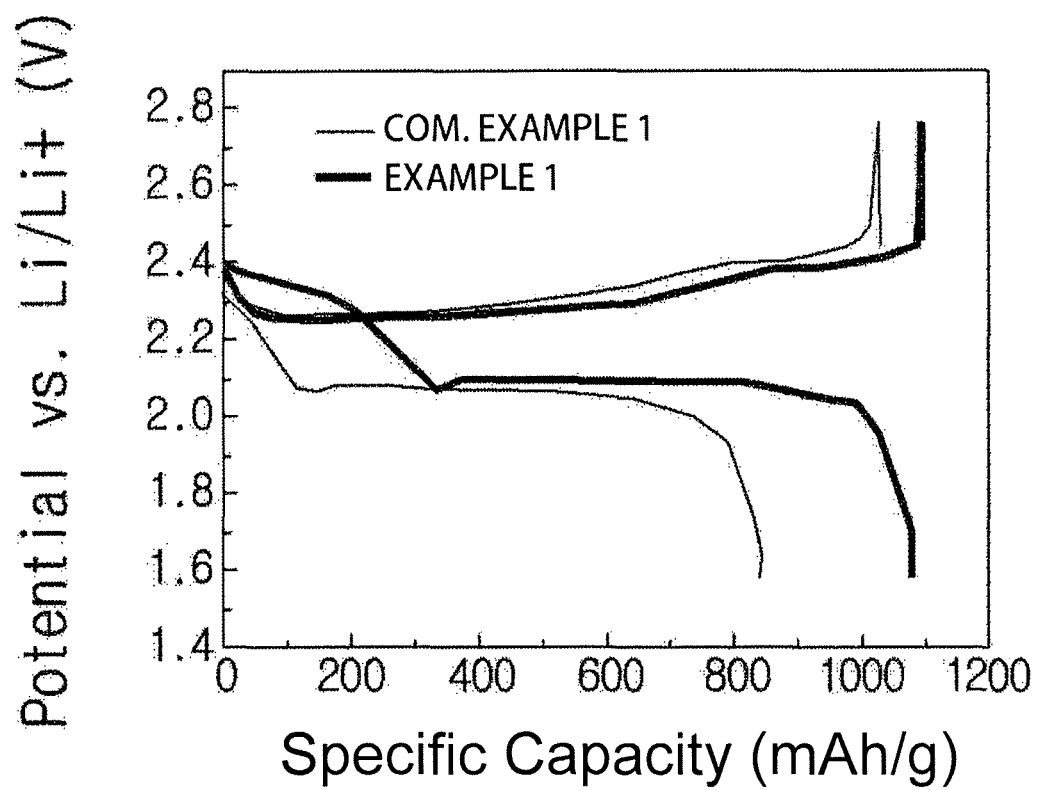
FIGS. 2 to 4 are graphs showing charge and discharge test results of lithium sulfur batteries manufactured in Example 1 and Comparative Example 1 of the present disclosure.
Figure 3:
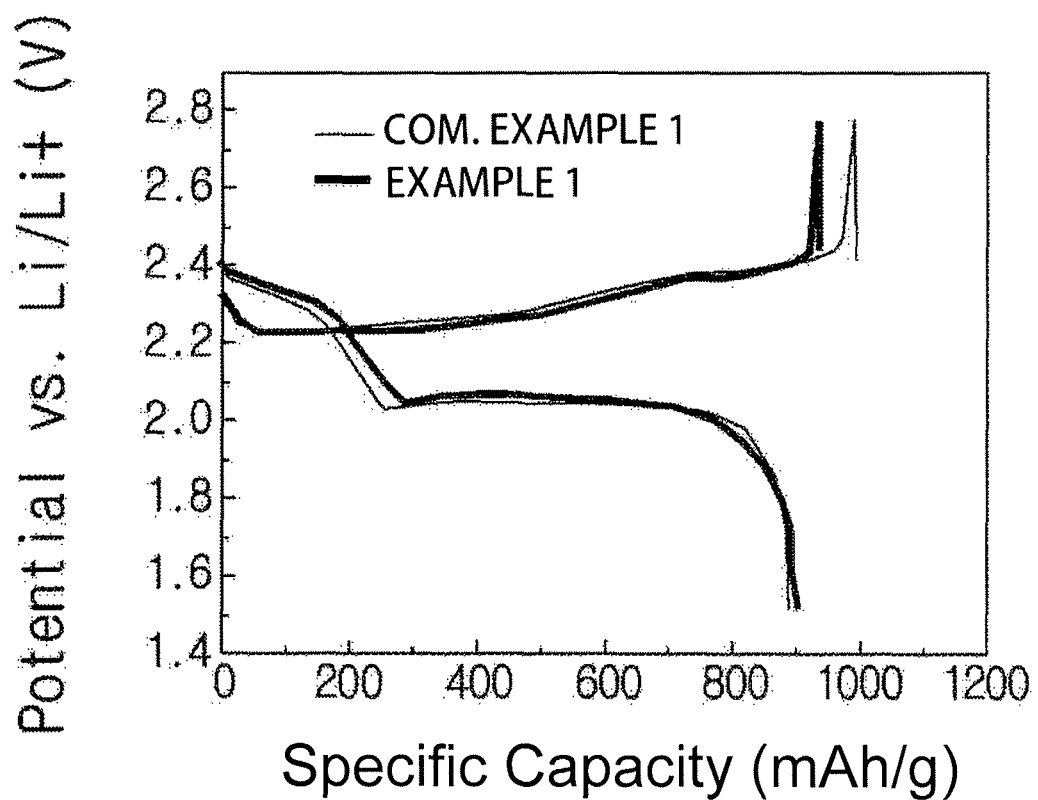
Figure 4:
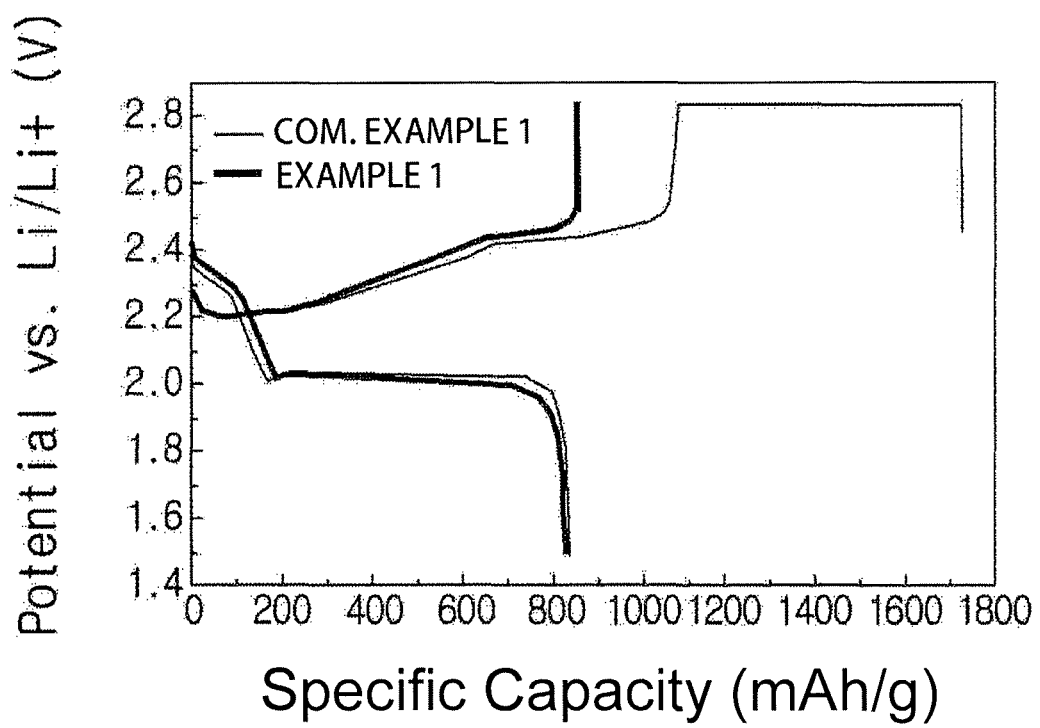

In addition, for the lithium sulfur batteries manufactured in Example 1 and Comparative Example 1, charge and discharge tests were carried out under the condition of 0.1 C in a voltage range of 1.5 V to 2.8 V. The results are shown in FIG. 2. FIGS. 2 to 4 are results at 1st cycle, 2nd cycle and $12^{th}$ cycle, respectively.

When referring to FIGS. 2 to 4, it was seen that the lithium sulfur battery using the gel polymer electrolyte of the present disclosure had enhanced Coulombic efficiency, initial discharging capacity, cyclability and the like due to a physical inhibition effect of a shuttle reaction.

The present disclosure relates to a lithium sulfur battery preventing degeneration caused by a shuttle effect, and a method for manufacturing the same.

The lithium sulfur battery comprises a gel polymer electrolyte configured to inhibit a transfer of a polysulfide-based material to a negative electrode so as to prevent a loss of the polysulfide formed on a positive electrode surface during charge and discharge reactions, whereby lifespan characteristics of the lithium sulfur battery are enhanced.

The invention claimed is:

1. A lithium sulfur battery comprising:
a positive electrode and a negative electrode disposed opposite to each other;
a separator positioned between the positive electrode and the negative electrode,
wherein the separator is a porous polymer film or porous non-woven fabric,
wherein the separator is in direct contact with the negative electrode;
a liquid electrolyte; and
a gel polymer electrolyte membrane positioned between and in direct contact with both the separator and the positive electrode,
wherein the gel polymer electrolyte membrane comprises a polymer matrix and the electrolyte,
wherein the electrolyte comprises an organic solvent, a lithium salt and $LiNO_3$,
wherein the organic solvent is selected from the group consisting of triethylene glycol dimethyl ether (TEGDME), dioxolane (DOL), dimethoxyethane (DME) and mixed solutions thereof,
wherein the electrolyte is in contact with the positive electrode and the negative electrode,
wherein the polymer matrix comprises a polymer formed by polymerizing a trimethylolpropane ethoxylate triacrylate monomer, and
wherein the trimethylolpropane ethoxylate triacrylate has a weight average molecular weight of 200 g/mol to 1000 g/mol.

2. The lithium sulfur battery of claim 1, wherein the gel polymer electrolyte membrane is coated on a surface of the positive electrode or a surface of the separator.

3. The lithium sulfur battery of claim 1, wherein the $LiNO_3$ is 1-10 wt % of the gel polymer electrolyte membrane.

4. A method for manufacturing the lithium sulfur battery of claim 1 comprising:
mixing a monomer, the organic solvent, the lithium salt and the $LiNO_3$,
wherein the organic solvent is selected from the group consisting of triethylene glycol dimethyl ether (TEGDME), dioxolane (DOL), dimethoxyethane (DME) and mixed solutions thereof; and
coating the mixture on the positive electrode or the separator and then curing the result to prepare the gel polymer electrolyte membrane positioned between the separator and the positive electrode.

5. The method for manufacturing a lithium sulfur battery of claim 4, wherein the monomer is trimethylolpropane ethoxylate triacrylate.

6. The method for manufacturing a lithium sulfur battery of claim 4, wherein the lithium salt is lithium bis-trifluoromethanesulfonimide (LiTFSI).

* * * * *